(12) United States Patent
Lineton et al.

(10) Patent No.: US 11,719,184 B1
(45) Date of Patent: Aug. 8, 2023

(54) PISTON WITH ENGINEERED CROWN COATING AND METHOD OF MANUFACTURING

(71) Applicant: Tenneco Inc., Lake Forest, IL (US)

(72) Inventors: Warran Lineton, Chelsea, MI (US); Greg Salenbien, Britton, MI (US)

(73) Assignee: Tenneco Inc., Lake Forest, IL (US)

(*) Notice: Subject to any disclaimer, the term of this patent is extended or adjusted under 35 U.S.C. 154(b) by 0 days.

(21) Appl. No.: 17/581,391

(22) Filed: Jan. 21, 2022

(51) Int. Cl.
| | |
|---|---|
| *F02F 3/28* | (2006.01) |
| *C23C 4/18* | (2006.01) |
| *F02F 3/00* | (2006.01) |
| *C23C 4/11* | (2016.01) |
| *C23C 4/134* | (2016.01) |
| *C23C 4/02* | (2006.01) |
| *F02F 3/10* | (2006.01) |

(52) U.S. Cl.
CPC ............. *F02F 3/0084* (2013.01); *C23C 4/02* (2013.01); *C23C 4/11* (2016.01); *C23C 4/134* (2016.01); *C23C 4/18* (2013.01); *F02F 3/10* (2013.01); *F02F 3/28* (2013.01)

(58) Field of Classification Search
CPC .............. F02F 3/0084; F02F 3/10; F02F 3/28
See application file for complete search history.

(56) References Cited

U.S. PATENT DOCUMENTS

| | | | |
|---|---|---|---|
| 5,097,807 A | | 3/1992 | Oikawa et al. |
| 5,384,200 A | * | 1/1995 | Giles ................ C23C 4/11 |
| | | | 428/545 |
| 6,877,473 B2 | | 4/2005 | Bischofberger et al. |

(Continued)

FOREIGN PATENT DOCUMENTS

| | | |
|---|---|---|
| CA | 2989016 A1 | 6/2019 |
| EP | 0303444 A2 | 2/1989 |

(Continued)

OTHER PUBLICATIONS

International Search Report, dated Apr. 14, 2023 (PCT/US2022/081928).

*Primary Examiner* — Long T Tran
(74) *Attorney, Agent, or Firm* — Robert L. Stearns; Dickinson Wright PLLC

(57) ABSTRACT

A steel piston with an engineered coating is provided. A high thermal conductivity material, for example copper, is disposed on first regions of a combustion bowl to reduce hot spots in the piston. A low thermal conductivity material, for example a ceramic, is disposed on second regions of the combustion bowl to reduce loss of heat through the piston. The high thermal conductivity material disposed on the combustion bowl has a surface roughness ($R_a$) of less than 5 μm to help reflect IR radiation and promote fuel flow. The low thermal conductivity material disposed on the combustion bowl has a surface roughness ($R_a$) of less than 3 μm to promote fuel flow. The low thermal conductivity material is also disposed on the bowl rim and top ring land, and has a surface roughness ($R_a$) of greater than 8 μm on the bowl rim and top ring land to retard gas flow.

13 Claims, 2 Drawing Sheets

(56) References Cited

U.S. PATENT DOCUMENTS

| | | | |
|---|---|---|---|
| 10,018,146 B2 | 7/2018 | Azevedo et al. | |
| 10,578,050 B2 | 3/2020 | Lineton et al. | |
| 10,634,090 B2 | 4/2020 | DiMascio et al. | |
| 10,731,259 B2 | 8/2020 | Koeberlein et al. | |
| 10,876,475 B2 | 12/2020 | Lineton | |
| 10,995,661 B2 | 5/2021 | Lineton et al. | |
| 2013/0025561 A1 | 1/2013 | Gabriel et al. | |
| 2014/0352646 A1* | 12/2014 | Tomita | C04B 41/89 123/193.5 |
| 2015/0204233 A1* | 7/2015 | Nanba | F02B 23/08 427/302 |
| 2016/0245224 A1* | 8/2016 | Ruona | F02F 3/10 |
| 2017/0089260 A1* | 3/2017 | Bookbinder | B32B 15/16 |
| 2020/0072159 A1* | 3/2020 | Cromme | C23C 28/04 |

FOREIGN PATENT DOCUMENTS

| | | |
|---|---|---|
| JP | 2009030458 A | 2/2009 |
| JP | 2013067823 A | 4/2013 |
| JP | 2017207013 A | 11/2017 |
| JP | 2020079561 A | 5/2020 |
| WO | 2017087733 A1 | 5/2017 |

\* cited by examiner

PISTON WITH ENGINEERED CROWN COATING AND METHOD OF MANUFACTURING

BACKGROUND OF THE INVENTION

1. Field of the Invention

This invention relates generally to pistons for internal combustion engines, including coated pistons for diesel engines, and methods of manufacturing the same.

2. Related Art

Modern heavy duty diesel engines are being pushed towards increased efficiency under emissions and fuel economy legislation. To achieve greater efficiency, the engines must run hotter and at higher peak pressures. Thermal losses through the combustion chamber become problematic under these increased demands. Typically, about 4% to 6% of available fuel energy is lost as heat through the piston into the cooling system. One way to improve engine efficiency is to extract energy from hot combustion gases by turbo-compounding. For example, about 4% to 5% of fuel energy can be extracted from the hot exhaust gases by turbo-compounding.

Another way to improve engine efficiency includes reducing heat losses to the cooling system by insulating the crown of the piston. Insulating layers, including ceramic materials, are one way of insulating the piston. One option includes applying a metal bonding layer to the metal body portion of the piston followed by a ceramic layer. However, the layers are discrete and the ceramic is by its nature porous. Thus, combustion gases can pass through the ceramic and start to oxidize the metal bonding layer at the ceramic/bonding layer interface, causing a weak boundary layer to form and potential failure of the coating over time. In addition, mismatches in thermal expansion coefficients between adjacent layers, and the brittle nature of ceramics, create the risk for delamination and spalling.

Another example is a thermally sprayed coating formed of yttria stabilized zirconia. This material, when used alone, can suffer destabilization through thermal effects and chemical attack in diesel combustion engines. It has also been found that thick ceramic coatings, such as those greater than 500 microns, for example 1 mm, are prone to cracking and failure.

It has also been found that typical aerospace coatings used for jet turbines are not suitable for engine pistons because of raw material and deposition costs. In addition, there are operating differences associated with the highly cyclical nature of the thermal stresses and physical stresses imposed by the internal combustion engine. Although more than 40 years of thermal coating development for pistons is documented in literature, there is still a need for a more successful and cost effective product.

SUMMARY

Applicant has found that soot deposits on the crowns of pistons running in heavy duty diesel engines show that there are different local environments present on the piston. For example, temperature differences of hundreds of degrees can occur over a distance of a few millimeters. Thus, not all regions of the piston crown should be treated equal, for example the same coating material should not be applied to the entire crown. The coating materials should help achieve desired properties at a local level, for example in line with injector sprays, between sprays, at a bowl edge, or around a periphery of the crown.

One aspect of the invention provides a piston coated with materials in specific regions that are capable of achieving targeted properties. The piston comprises a body portion formed of metal and including a combustion bowl surrounded by a bowl rim. A high thermal conductivity material is disposed on at least one first region of the combustion bowl for reducing hot spots in the piston body. The high thermal conductivity material has a thermal conductivity of at least 100 W/mK. A low thermal conductivity material is disposed on at least one second region of the combustion bowl different from the at least one first region for reducing loss of heat through the piston body. The low thermal conductivity material has a thermal conductivity of not greater than 1 W/mK.

Another aspect of the invention provides a method of manufacturing a piston. The method comprises the steps of applying a high thermal conductivity material to at least one first region of a combustion bowl of a piston body, the high thermal conductivity material having a thermal conductivity of at least 100 W/mK; and applying a low thermal conductivity material to at least one second region of said combustion bowl different from the at least one first region, the low thermal conductivity material having a thermal conductivity of not greater than 1 W/mK.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF EXAMPLE EMBODIMENTS

One aspect of the invention provides a piston 10 having an engineered coating. The coating includes different materials 12, 14 in different regions in order to achieve targeted properties, for example a high thermal conductivity material 12 and a low thermal conductivity material 14. The high thermal conductivity material 12 disposed on select regions will even out hot spots, while the low thermal conductivity material 14 disposed on other regions can provide excellent insulation. The high and low thermal conductivity materials 12, 14 are also designed to have roughness values that inhibit gas flow and thus reduce hydrocarbon emissions, or promote flow of a fuel plume and thus increase combustion flame front propagation.

The piston 10 includes a body portion formed of metal, for example steel or another iron-based material. According to some example embodiments, the body portion includes no phosphate. In these embodiments, no phosphate is present on the regions of the body portion to which the high thermal conductivity material 12 is applied and to which the low thermal conductivity material 14 is applied. According to other example embodiments, phosphate is disposed on a portion of the body portion, for example a crown of the body portion or the areas of the body portion which are not coated with the high and low thermal conductivity materials 12, 14. The phosphate may be advantageous for pin bore break-in and oil retention.

Figure 1:
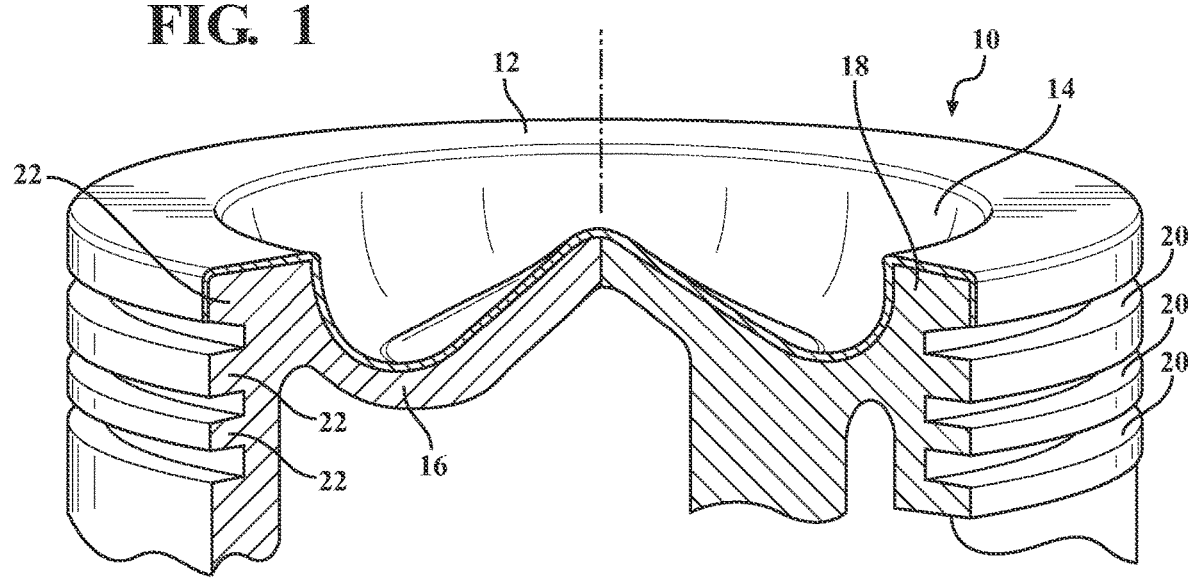
FIG. 1 is a perspective sectional view a diesel engine piston including an engineered coating according to an example embodiment.

As shown in FIG. 1, the crown extends circumferentially around a center axis. The crown includes a combustion bowl 16 surrounded by a bowl rim 18. The combustion bowl 16 includes an apex at the center axis. The crown also includes ring grooves 20 located at an outer diameter surface and depending from the bowl rim 18. The ring grooves 20 extend circumferentially about the center axis. The crown also includes ring lands 22 spacing the ring grooves 20 from one another.

The high thermal conductivity material 12 is disposed on at least one first region of the combustion bowl 16 for reducing hot spots in the piston body. The high thermal conductivity material 12 may be disposed on a plurality of the first regions of the combustion bowl 16, for example first regions which are spaced from one another. The high thermal conductivity material 12 has a thermal conductivity of at least 100 W/mK, and typically at least 300 W/mK. According to example embodiments, the high thermal conductivity material 12 is copper or a copper alloy. The high thermal conductivity material 12 disposed on the first regions of the combustion bowl 16 preferably has a surface roughness ($R_a$) of less than 5 μm to help reflect IR radiation and promote fuel flow.

According to example embodiments, the high thermal conductivity material 12 is also disposed on at least one or a plurality of first regions of the bowl rim 18 to reduce hot spots in the body portion. The high thermal conductivity material 12 disposed on the first regions of the bowl rim 18 has a surface roughness ($R_a$) of greater than 8 μm to retard gas flow.

According to example embodiments, the high thermal conductivity material 12 is also disposed on a top one of the ring lands 22. The high thermal conductivity material 12 disposed on the top one of the ring lands 22 preferably has a surface roughness ($R_a$) of greater than 8 μm to retard gas flow.

Figure 2:
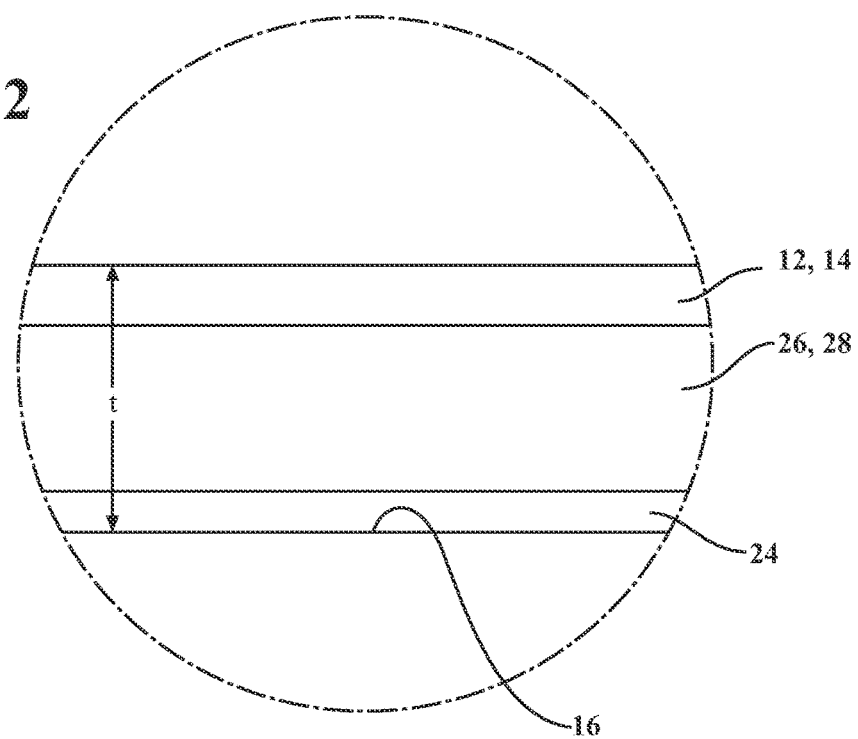
FIG. 2 is a cross-sectional view of a high or low thermal conductivity material, a first or second transition material, and a bond material disposed on a combustion bowl of a piston according to an example embodiment.

As shown in FIG. 2, a bond material 24 is typically disposed between the combustion bowl 16 and the high thermal conductivity material 12, as well as between the top one of the ring lands 22 and the high thermal conductivity material 12. According to example embodiments, the bond material 24 includes nickel, such as NiCrAlY. A first transition material 26 is typically disposed between the bond material 24 and the high thermal conductivity material 12. The first transition material 26 disposed between the bond material 24 and the high thermal conductivity material 12 includes a mixture of the bond material 24 and the high thermal conductivity material 12.

The low thermal conductivity material 14 is disposed on at least one second region of the combustion bowl 16 different from the at least one first region to reduce loss of heat through the piston body. The low thermal conductivity material 14 has a thermal conductivity of not greater than 1 W/mK. The low thermal conductivity material 14 may be disposed on a plurality of second regions of the combustion bowl 16, for example regions spaced from one another by the high thermal conductivity material 12. According to example embodiments, the low thermal conductivity material 14 disposed on the combustion bowl 16 has a surface roughness ($R_a$) of less than 3 μm to promote fuel flow.

Typically, the low thermal conductivity material 14 includes ceramic, for example ceria stabilized zirconia or another zirconia based ceramic.

The bond material 24 is also preferably disposed between the combustion bowl 16 and the low thermal conductivity material 14. A second transition material 28 is typically disposed between the bond material 24 and the low thermal conductivity material 14. The second transition material 28 disposed between the bond material 24 and the low thermal conductivity material 14 includes a mixture of the bond material 24 and the low thermal conductivity material 14.

According to example embodiments, the low thermal conductivity material 14 is also disposed on at least one or a plurality of first regions of the bowl rim 18 to reduce heat loss through the body portion. The low thermal conductivity material 14 disposed on the first regions of the bowl rim 18 has a surface roughness ($R_a$) of greater than 8 μm to retard gas flow.

According to example embodiments, the low thermal conductivity material 14 is also disposed on a top one of the ring lands 22. The low thermal conductivity material 14 disposed on the top one of the ring lands 22 preferably has a surface roughness ($R_a$) of greater than 8 μm to retard gas flow.

According to example embodiments, the materials 12, 14 disposed on the combustion bowl 16 together have a total thickness t of not greater than 1 mm. The materials 12, 14 disposed on the bowl rim 18 together have a total thickness t of not greater than 1 mm. The materials 12, 14 disposed on the top ring land 22 together have a total thickness t of not greater than 1 mm.

Figure 3:
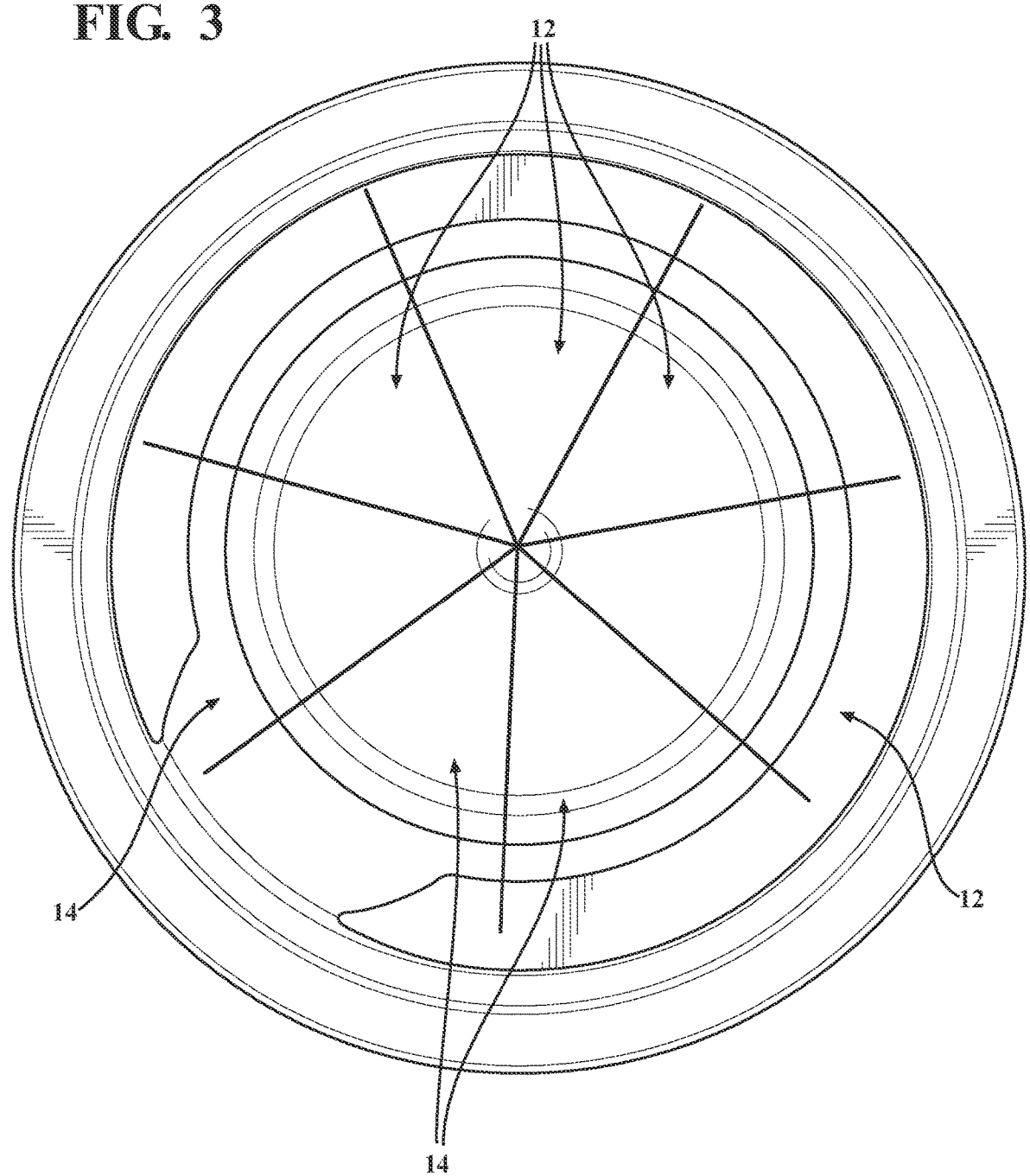
FIG. 3 is a top view of a coated piston according to an example embodiment.

The high and low thermal conductivity materials 12, 14 are preferably precisely applied to achieve the desired properties. According to an example embodiment, as shown in FIG. 3, the high thermal conductivity material 12 is applied to the first region of the combustion bowl 16 on the anti-thrust side of the piston 10, and the low thermal conductivity material 14 is applied to the second region of the combustion bowl 16 on the thrust side of the piston 10. The high thermal conductivity material 12 is also applied to the first region of the bowl rim 18 on the front side of the piston 10. The high and low thermal conductivity materials 12, 14 can also be placed in specific locations that are dependent on the fuel injectors of the engine. For example, the high thermal conductivity material 12 can be applied to locations in line with the fuel injectors, and the low thermal conductivity material 14 could be applied to locations which are between two or more fuel injectors. This precise placement of the high and low thermal conductivity materials 12, 14 allows for the fuel plume and flame front to interact most favorably with the surface of the piston 10 for combustion and heat transfer.

Another aspect of the invention provides a method of manufacturing the piston 10. The method comprises the steps of applying the high thermal conductivity 12 material to the at least one first region of the combustion bowl 16 of the piston body; and applying the low thermal conductivity material 14 to the at least one second region of the combustion bowl 16 different from the at least one first region.

According to example embodiments, prior to applying the high and low thermal conductivity materials 12, 14, the method includes wrapping the piston body in a protective covering and leaving only regions to be coated exposed. The method may include trimming the protective covering, for example tape, so that only regions to be coated are exposed. The method can then include grit blasting the exposed regions of the piston body with alumina; blowing the piston body with dry compressed air; and washing the piston body with solvent.

Next, according to example embodiments, prior to applying the high and low thermal conductivity materials 12, 14, the method includes disposing the piston body in a fixture of a plasma spray booth. Optionally, the method can include applying a mask with slots over the crown of the piston body. The mask can be a single use or reuseable mask. As an alternative to the masks, a spray head and robot can be used to apply the high and low thermal conductivity materials 12, 14 in a desired pattern, without the masks This method typically creates overlap of the high and low thermal conductivity materials 12, 14, and the overlap provides composite properties different from those of the high or low thermal conductivity material 12, 14 alone.

The steps of applying the high thermal conductivity material 12 and the low thermal conductivity material 14 include spraying the material from a plasma torch onto the piston body and moving a plasma torch along the piston body. The method can also include rotating the piston body while applying the high thermal conductivity material 12 and the low thermal conductivity material 14 to the piston body. The rotating step can be at 700 rpm, for example. Typically, the materials 12, 14 are applied by patterned plasma deposition with a six axis robot. Two or more powder feeders are typically used to feed the materials 12, 14, and the materials 12, 14 are applied in the form of powder. A robot program is typically used to define tool path and deposition conditions.

The method further includes polishing or smoothing the high thermal conductivity material 12 and the low thermal conductivity material 14 on the piston body to achieve the desired roughness. The polishing is typically done by rotating and applying abrasive to the material, vibrating, rotating a shaped abrasive material, mass finishing in a vibrating tub with abrasive media, or by a polishing wheel with diamond discs and suspensions (for flat squish zone only).

Finally, according to example embodiments, any masking is removed from the piston 10, and the method includes cleaning the polished piston with solvent. Rust prevention can be applied to the coated piston 10. The coated piston 10 can then be shipped to vendors for application of a manganese phosphate coating and skirt coating.

Obviously, many modifications and variations of the present invention are possible in light of the above teachings and may be practiced otherwise than as specifically described while within the scope of the following claims.

The invention claimed is:

1. A piston, comprising:
a body portion formed of metal;
said body portion including a combustion surface, the combustion surface including a combustion bowl surrounded by a bowl rim;
said combustion bowl extending radially from a center axis of said body portion to said bowl rim, and said bowl rim extending circumferentially around said combustion bowl;
a high thermal conductivity material disposed on at least one first region of said combustion surface, said high thermal conductivity material having a thermal conductivity of at least 100 W/mK;
a low thermal conductivity material disposed on at least one second region of said combustion surface spaced radially and/or circumferentially from said at least one first region, said low thermal conductivity material having a thermal conductivity of not greater than 1 W/mK.

2. The piston of claim 1, wherein said low thermal conductivity material is disposed on said bowl rim.

3. The piston of claim 2, wherein said low thermal conductivity material disposed on said bowl rim has a surface roughness ($R_a$) of greater than 8 µm.

4. The piston of claim 1, wherein said combustion surface includes ring lands, and said low thermal conductivity material is disposed on a top one of said ring lands.

5. The piston of claim 4, wherein said low thermal conductivity material disposed on said top one of said ring lands has a surface roughness ($R_a$) of greater than 8 µm.

6. The piston of claim 4, wherein said high thermal conductivity material is disposed on a plurality of said first regions of said combustion bowl; said low thermal conductivity material is disposed on a plurality of first regions of said bowl rim; and said low thermal conductivity material is disposed on a plurality of said second regions of said combustion bowl.

7. The piston of claim 1, wherein said high thermal conductivity material has a thermal conductivity of at least 300 W/mK; and said low thermal conductivity material includes ceramic.

8. The piston of claim 1, wherein said high thermal conductivity material is copper or a copper alloy; and said low thermal conductivity material is ceria stabilized zirconia.

9. The piston of claim 8, wherein a bond material is disposed between said piston body and said high thermal conductivity material, said bond material is disposed between said piston body and said low thermal conductivity material, a first transition material is disposed between said bond material and said high thermal conductivity material, said first transition material is a mixture of said bond material and said high thermal conductivity material, a second transition material is disposed between said bond material and said low thermal conductivity material, and said second transition material includes a mixture of said bond material and said low thermal conductivity material.

10. The piston of claim 1, wherein said metal of said body portion is steel,
no phosphate is present on portions of said body portion to which said high thermal conductivity material and to which said low thermal conductivity material is applied,
said body portion includes a crown, and said crown includes said combustion bowl and said bowl rim;
said crown extends circumferentially about a center axis;
said combustion bowl includes an apex at said center axis;
said crown includes ring grooves located at an outer diameter surface and depending from said bowl rim;
said ring grooves extending circumferentially about said center axis;
said crown includes ring lands spacing said ring grooves from one another;
said high thermal conductivity material is disposed on a plurality of said first regions of said combustion bowl;
said high thermal conductivity material has a thermal conductivity of at least 300 W/mK;
said high thermal conductivity material is copper or a copper alloy;
said high thermal conductivity material disposed on said combustion bowl has a surface roughness ($R_a$) of less than 5 µm for helping to reflect IR radiation and promoting fuel flow;

said low thermal conductivity material is disposed on a plurality of first regions of said bowl rim;
said low thermal conductivity material disposed on said bowl rim has a surface roughness ($R_a$) of greater than 8 μm for helping to retard gas flow;
said low thermal conductivity material is disposed on a top one of said ring lands;
said low thermal conductivity material disposed on said top one of said ring lands has a surface roughness ($R_a$) of greater than 8 μm for helping to retard gas flow;
a bond material is disposed between said combustion bowl and said high thermal conductivity material;
a bond material is disposed between said top one of said ring lands and said high thermal conductivity material;
said bond material includes nickel;
said bond material is NiCrAlY;
a first transition material disposed between said bond material and said high thermal conductivity material;
said first transition material disposed between said bond material and said high thermal conductivity material includes a mixture of said bond material and said high thermal conductivity material;
said low thermal conductivity material is disposed on a plurality of second regions of said combustion bowl;
said low thermal conductivity material has a thermal conductivity of not greater than 1 W/mK;
said low thermal conductivity material disposed on said combustion bowl has a surface roughness ($R_a$) of less than 3 μm for promoting fuel flow;
said low thermal conductivity material includes ceramic;
said ceramic is ceria stabilized zirconia;
said bond material is disposed between said combustion bowl and said low thermal conductivity material;
a second transition material is disposed between said bond material and said low thermal conductivity material;
said second transition material disposed between said bond material and said low thermal conductivity material includes a mixture of said bond material and said low thermal conductivity material;
said materials disposed on said combustion bowl together having a total thickness of not greater than 1 mm;
said materials disposed on said bowl rim together having a total thickness of not greater than 1 mm; and
said materials disposed on said top ring land together having a total thickness of not greater than 1 mm.

11. A piston, comprising:
a body portion formed of metal;
said body portion including a combustion surface, the combustion surface including a combustion bowl surrounded by a bowl rim;
said combustion bowl extending radially from a center axis of said body portion to said bowl rim, and said bowl rim extending circumferentially around said combustion bowl;
a high thermal conductivity material disposed on at least one first region of said combustion surface, said high thermal conductivity material having a thermal conductivity of at least 100 W/mK,
a low thermal conductivity material disposed on at least one second region of said combustion surface different from said at least one first region, said low thermal conductivity material having a thermal conductivity of not greater than 1 W/mK, wherein said high thermal conductivity material disposed on said combustion surface has a surface roughness ($R_a$) of less than 5 μm; and said low thermal conductivity material disposed on said combustion surface has a surface roughness ($R_a$) of less than 3 μm.

12. A piston, comprising:
a body portion formed of metal;
said body portion including a combustion surface, the combustion surface including a combustion bowl surrounded by a bowl rim;
a high thermal conductivity material disposed on at least one first region of said combustion surface, said high thermal conductivity material having a thermal conductivity of at least 100 W/mK;
a low thermal conductivity material disposed on at least one second region of said combustion surface different from said at least one first region, said low thermal conductivity material having a thermal conductivity of not greater than 1 W/mK; and
wherein said low thermal conductivity material is disposed on said bowl rim and/or a top ring land and has a surface roughness ($R_a$) of greater than 8 μm.

13. A piston, comprising:
a body portion formed of metal;
said body portion including a combustion surface, said combustion surface including a combustion bowl surrounded by a bowl rim;
a high thermal conductivity material disposed on at least one first region of said combustion surface, said high thermal conductivity material having a thermal conductivity of at least 100 W/mK;
a low thermal conductivity material disposed on at least one second region of said combustion surface different from said at least one first region, said low thermal conductivity material having a thermal conductivity of not greater than 1 W/mK, and said low thermal conductivity material being ceria stabilized zirconia.

* * * * *